United States Patent [19]

Klang

[11] 3,904,943

[45] Sept. 9, 1975

[54] CAPSTAN SERVO SYSTEM

[75] Inventor: Daniel M. Klang, Irvine, Calif.

[73] Assignee: California Computer Products, Inc., Anaheim, Calif.

[22] Filed: May 15, 1974

[21] Appl. No.: 469,960

[52] U.S. Cl. .................. 318/395; 318/398; 318/410

[51] Int. Cl.² ............................................ G05B 5/01

[58] Field of Search ........... 318/395, 398, 396, 397, 318/407, 410

[56] References Cited

UNITED STATES PATENTS 3,309,597 3/1967 Gabor et al. .................... 318/396 X 3,359,477 12/1967 Wasai et al. .................... 318/395 X 3,621,354 11/1971 Fawcett .......................... 318/395 X

*Primary Examiner*—B. Dobeck

*Attorney, Agent, or Firm*—Bruce D. Jimerson

[57] ABSTRACT

The specification discloses a Tape Transport Drive System for eliminating shaft "windup" between a capstan and tachometer. The system utilizes shaped current pulses for velocity correction as well as acceleration or deceleration commands.

1 Claim, 3 Drawing Figures

THEORY OF OPERATION
BLOCK DIAGRAM

THEORY OF OPERATION
BLOCK DIAGRAM

CAPSTAN SERVO SYSTEM

BACKGROUND OF THE INVENTION

The present invention relates to a system for minimizing the shaft "windup" which occurs in a tape transport system which utilizes a digital tachometer for sensing the capstan velocity. Ideally, the speed variation between the capstan and transducer (digital tach) should be zero. However, unless a reflective transducer is used which is affixed to the face of the capstan, there will be some separation between the transducer and capstan. In the present system the capstan and transducer are separated by approximately 1 inch — and although the average speed of the transducer is the same as that of the capstan, there is an instantaneous speed variation between the elements due to the torsional deflection of the common shaft. What is actually desired is a means for modifying the current pulses applied to the servo motor to reduce the torsional oscillations of the shaft. In addition, it is also desirable to reduce the magnitude of the oscillation which is produced as a consequence of the digital servo system increasing or decreasing the number of pulses per unit time in order to maintain the correct average velocity. It is thus an additional objective of the invention to produce a decrease in the amplitude of the velocity variation when the system is operating under a steady state run command.

Other objects and advantages of the present invention will be obvious from the detailed description of a preferred embodiment given herein below.

SUMMARY OF THE INVENTION

The aforementioned objects are realized by the present invention which comprises a system for shaping the conventional rectangular current pulse waveform of a digital servo so as to produce an approximately exponential rise time. In both the acceleration/deceleration, and run mode, the modification of the current waveform is achieved using an R-C network. Switching from the high current (acceleration or deceleration mode) to the low current (run mode) is accomplished by the system logic — in response to the command signals and feedback signals from the digital tach. The transition from the acceleration/ deceleration mode to the run mode is set at 86% of the nominal capstan run velocity. The additional impetus for achieving the required angular velocity with a minimum of overshoot is provided by the collapsing magnetic field of the armature inductance.

DETAILED DESCRIPTION OF A PREFERRED EMBODIMENT

Figure 1:
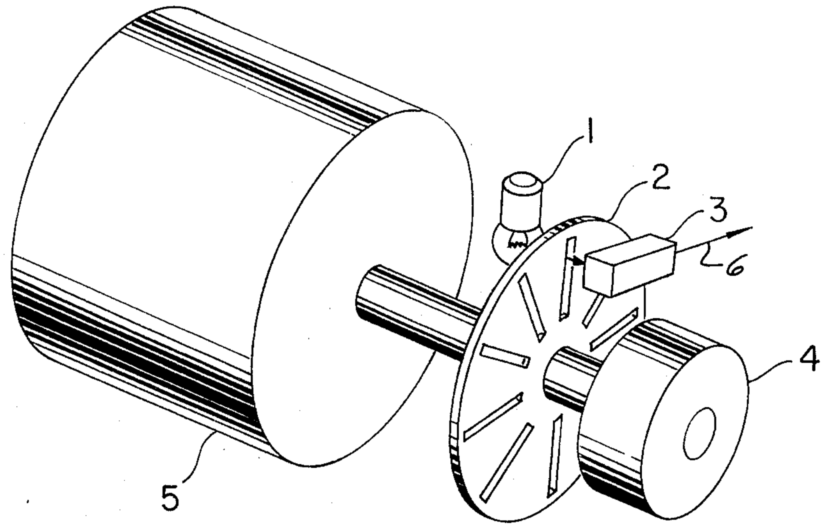
FIG. 1 shows a perspective view of the motor and digital tach.

Adverting to the drawings, and particularly FIG. 1, the basic elements for generating a digital signal which is proportional to the speed of motor 5 comprises a light source 1, a photosensitive pickup 3 and a disk 2 having a plurality of equally spaced apertures interposed between the light source 1 and pickup 3. As shown in the FIGURE, the capstan 4 is spaced apart from the disk 2 — this spacing being necessary because of the physical size of the elements comprising the digital tach. As a consequence of this spacing, the instantaneous angular velocity of the capstan 4 will differ from the instantaneous angular velocity of the disk 2 during the acceleration mode.

Figure 3:
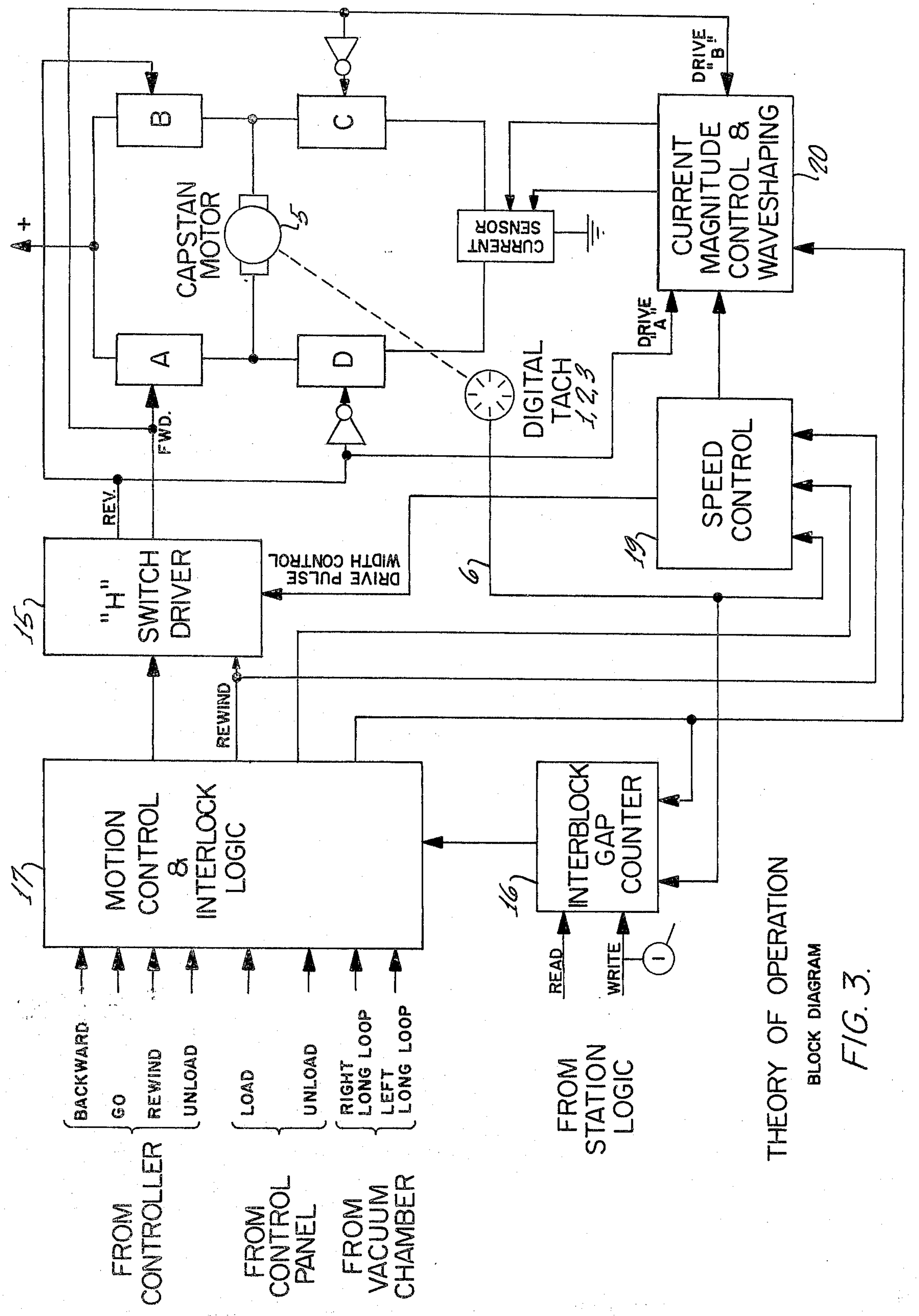
FIG. 3 shows a block diagram of the servo system.

FIG. 3 shows the system elements in block diagram form. The capstan motor is driven from a transistor comprising elements A, B, C and D. The output pulses on line 6 of the digital tach are fed to a speed control circuit 19. The speed control circuit 19 includes a crystal oscillator, an 8 bit counter, an overflow Flip Flop, a run Flip Flop and a slow Flip Flop. The counter counts the crystal oscillator clock pulses between the tach pulses on line 6. If the tach pulse does not occur when the counter reaches a predetermined count, the overflow Flip Flop is set. The overflow Flip Flop in turn sets the run Flip Flop which is reset when the tach pulse arrives. If the overflow Flip Flop remains set longer than a predetermined count (equivalent to 14% of the nominal run velocity) a slow Flip Flop is set — thus indicating that the capstan did not reach 86% of the nominal run velocity. As long as the slow Flip Flop is set, the current magnitude control circuits in box 20 applies a high current pulse (approx. 20 amps) to the motor. When the slow Flip Flop is reset, but the run Flip Flop remains set, the current magnitude control circuits apply low current pulses (approx. 3 amps) to the motor to reach the required velocity. When both the slow Flip Flop and run Flip Flop are reset, all drive is cut off — the motor is coasting.

As previously mentioned, the change from the high current acceleration mode to the low current run mode is effected when the capstan reaches 86% of the nominal run velocity. The capstan is then brought up to speed using a lower current pulse, the combined effect of the mechanical friction and reduced drive being such as to minimize the velocity overshoot. Once the capstan reaches the nominal run speed, the velocity will oscillate about an average value due to the fact that the current is applied incrementally — whereas the frictional forces of the tape and motor are continuous. As also previously mentioned, the torsional forces produced during the acceleration mode tend to wind up the shaft between the capstan 4 and tach disk 2. The amplitude of the instantaneous run velocity variation as well as the torsional wind up can be decreased using the current shaping techniques described below.

Figure 2:
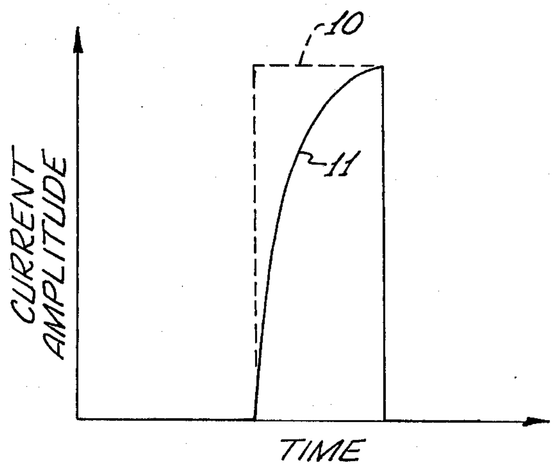
FIG. 2 shows how the current waveform is modified in accordance with the teachings of the invention.

FIG. 2 shows a profile of the current waveform. Initially, both the low current and high current pulses have an approximate rectangular waveshape as indicated by the dotted profile 10. During the run mode, the low current pulses are applied to a wave shaping circuit in box 20 (typically an R-C network having a time constant of approx. 120$\mu$ sec), whereas during the acceleration mode the high current pulses are applied to a similar wave shaping circuit in box 20 having a time constant of approximately 200$\mu$ sec.

The remaining parts of the system (switch drivers 15, gap counter 16, motion control logic 17) are illustrated only to establish the environment of the present invention. The details of these circuits are not shown, as they constitute prior art and form no part of the present invention.

Although the present invention has been shown and described in connection with its application to a tape transport system, it will be evident that the basic concepts could be utilized in numerous digital servo mechanisms. It will also be recognized that the idea has been disclosed in block diagram form — and that the particular circuits may be implimented by a variety of structures which are within the skill of those in the art. Thus, although a preferred embodiment has been shown and described, it will be evident that the invention is not limited thereto, and that numerous changes, modifications and substitutions may be made without departing from the spirit of the invention.

I claim:

1. In a capstan servo system of the type utilizing a digital tach mounted to the capstan motor shaft, the improvement which comprises:

means for generating pulses having a high amplitude;

means for generating pulses having a low amplitude;

means connecting said high amplitude means to the capstan motor so as to cause said capstan motor to accelerate;

means connecting said low amplitude means to the capstan motor so as to cause the capstan motor to run at a prescribed velocity;

means for decreasing the rise time of pulses generated by said high and low amplitude means so as to reduce the velocity variations of said capstan; and means for detecting when the velocity of the capstan motor reaches a prescribed percentage of the prescribed velocity;

means responsive to said detection means for switching from said high amplitude means to said low amplitude means.

* * * * *